Jan. 8, 1929.

E. F. W. ALEXANDERSON 1,698,290

OSCILLATION GENERATOR

Filed Oct. 17, 1925

Inventor:
Ernst F.W. Alexanderson,
by Alexander S. Lenitz
His Attorney.

Patented Jan. 8, 1929.

1,698,290

UNITED STATES PATENT OFFICE.

ERNST F. W. ALEXANDERSON, OF SCHENECTADY, NEW YORK, ASSIGNOR TO GENERAL ELECTRIC COMPANY, A NEW YORK CORPORATION.

OSCILLATION GENERATOR.

Application filed October 17, 1925. Serial No. 63,102.

My invention relates to apparatus for interconnecting circuits operated under different electrical conditions, and has for its object the provision of an improved oscillation generator that may be utilized efficiently to transmit power between such circuits.

The power losses incident to the operation of a generator comprising electric valves, such as the pliotron, are dependent on the product of the current and the voltage drop of the valve. In order to reduce these losses to a minimum, it is necessary that the plate voltage be maintained just high enough to overcome the space charge during the period of current transmission and that the changes between zero and full value of the current be produced quickly both at the beginning and end of this period. This involves the utilization of grid voltage waves, anode voltage waves and current waves of substantially rectangular form. In accordance with my invention, such waves are produced by means comprising reactors connected in parallel between the cathodes of a plurality of electric valves.

My invention will be better understood from the following description when considered in connection with the accompanying drawing and its scope will be pointed out in the appended claims.

Figure 1:
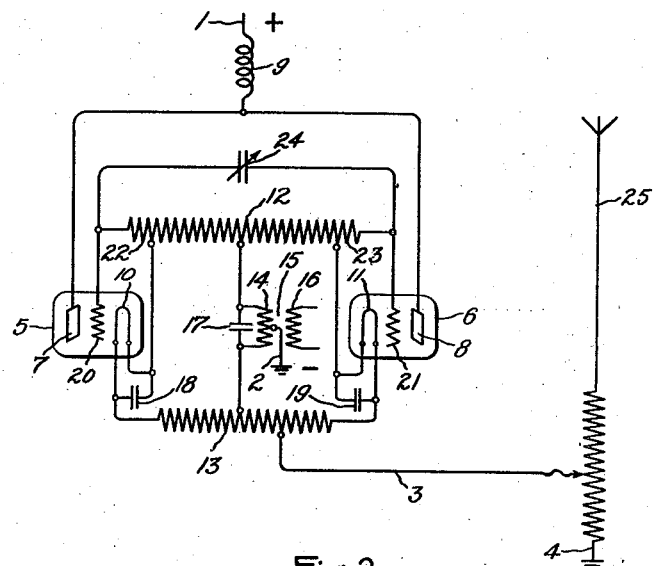
Figure 2:
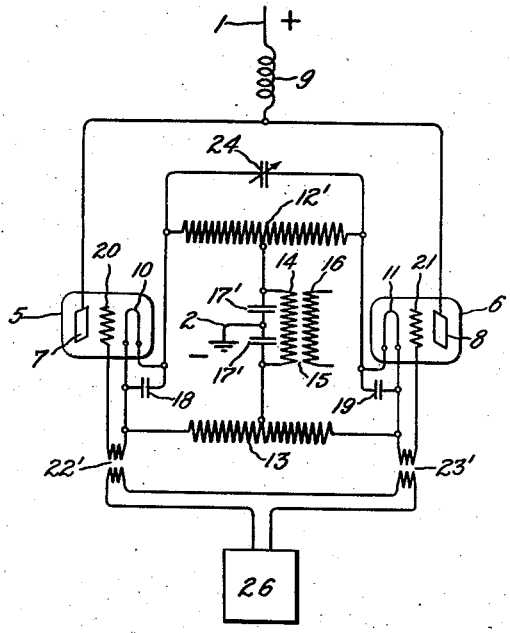

Referring to the drawing, Fig. 1 shows an oscillation generator wherein the grid circuits of the electric valves are inductively related to the oscillation circuit; and Fig. 2 shows a modification wherein the grid potentials of the electric valves are applied from an external source.

Fig. 1 shows a direct current circuit 1—2 which is connected to an alternating current circuit 3—4 through an oscillation generator comprising a pair of balanced valves 5 and 6. In this embodiment of the invention, anodes 7 and 8 of valves 5 and 6 respectively are connected to the conductor 1 through a smoothing reactor 9, and cathodes 10 and 11 of these valves are connected to the conductor 2 through opposite halves of parallel connected reactors 12 and 13 and the secondary circuit 14 of a cathode heating transformer 15 which comprises a primary circuit 16. Winding 14 is connected to the terminals of a high frequency shunt shown as a condenser 17. High frequency shunts, shown as condensers 18 and 19, are connected to the cathodes 10 and 11. Grids or control electrodes 20 and 21 are connected to cathodes 10 and 11 respectively through end sections 22 and 23 of reactor 12. An adjustable condenser 24 connected between the grids 20 and 21 is provided for controlling the frequency at which current is supplied from the direct current circuit 1—2 through the high frequency circuit 3—4 to the load shown as an antenna 25. It will be apparent that with the conductor 2 connected through transformer winding 14 to the midpoints of reactors 12 and 13 as indicated, the cathodes 10 and 11 are maintained at a potential considerably above ground.

The operation of the invention will be readily understood if it be assumed that current is just starting between the conductors 1 and 2 through valve 5. At this instant, current through valve 5 is rapidly increasing, the left hand end of coil 12 is charged to a positive potential with respect to cathode 10 and the charge of condenser 24 is increasing. This condition persists until the current of valve 5 attains a steady value. When this occurs, the voltages of coils 12 and 13 become zero, no voltage is applied to the grids 20 and 21, the condenser 24 starts discharging, an increasing negative potential is applied to grid 20 and an increasing positive potential is applied to grid 21, the current through valve 5 rapidly decreases to zero and that through valve 6 rapidly increases until it attains a steady value when the operation just described is repeated in reverse order.

It should be noted that there is a time when both valves pass current and that opening of valve 6 automatically reduces the current through valve 5 due to the fact that the coil 9 tends to maintain the total valve current at a constant value. The period during which both valves transmit current is commonly designated as the period of overlapping commutation. Under these conditions, each valve transmits current for a full half cycle, and the valve current quickly changes from its zero to its maximum value when the valve opens and likewise changes from its maximum to its zero value when the valve closes, thus minimizing the valve losses and increasing the efficiency of the oscillation generator.

Fig. 2 shows an embodiment of the invention wherein the generator excitation is supplied from an external source through a suitable master controller 26 and wherein high frequency shunts, shown as condensers 17' are connected in shunt to the winding 14. The operation of this embodiment of the invention is similar to that of the embodiment illustrated by Fig. 1 and will be readily understood without further explanation.

The embodiments of the invention illustrated and described herein have been selected for the purpose of clearly setting forth the principles involved. It will be apparent however, that the invention is susceptible of being modified to meet the different conditions encountered in its use and I therefore aim to cover by the appended claims all modifications within the true spirit and scope of my invention.

What I claim as new and desire to secure by Letters Patent of the United States is:—

1. The combination of a plurality of electric valves each comprising a cathode and a grid, a coil connected between said cathodes, a second coil interconnecting said grids and having a section arranged to complete a circuit comprising said cathodes and said first mentioned coil, and means interconnecting said coils at points intermediate their ends for transmitting heating current to said cathodes.

2. The combination of a plurality of electric valves each comprising a cathode and a grid, a coil connected between said cathodes, a second coil interconnecting said grids and having a section arranged to complete a circuit comprising said cathodes and said first mentioned coil, means interconnecting said coils at points intermediate their ends for transmitting heating current to said cathodes, and means connected to said grids in parallel with said second coil for controlling change in the relation between the potentials of said grids.

3. The combination of a plurality of electric valves each comprising a cathode and a grid, a coil connected between said cathodes, a second coil interconnecting said grids and having a section arranged to complete a circuit comprising said cathodes and said first mentioned coil, means interconnecting said coils at points intermediate their ends for transmitting heating current to said cathodes, and adjustable capacitance means connected to said grids in parallel with said second coil.

4. The combination of a plurality of electric valves each comprising a grid interposed between a cathode and an anode, a plurality of coils arranged to complete a circuit comprising said cathodes, means inductively related to said circuit and arranged to control the potentials of said grids, and a supply circuit having one of its terminals connected to said anodes and the other of its terminals connected to said coils at points intermediate their ends.

5. The combination of a plurality of electric valves each comprising a grid interposed between a cathode and an anode, a plurality of coils arranged to complete a circuit comprising said cathodes, means inductively related to said circuit and arranged to control the potentials of said grids, a supply circuit having one of its terminals connected to said anodes and the other of its terminals connected to said coils at points intermediate their ends, and a load circuit connected across a section of one of said coils.

6. The combination of a plurality of electric valves each comprising a grid interposed between a cathode and an anode, a coil connected between said cathodes, a second coil connected between said grids and having a section arranged to complete a circuit comprising said cathodes and said first mentioned coil, a direct current circuit connected to said anodes and to said coils at points intermediate their ends, an alternating current circuit connected to one of said coils, and means connected to said grids in parallel with said second coil for predetermining the frequency at which current is supplied to said alternating current circuit.

7. The combination of a plurality of electric valves each comprising a cathode and a grid, a plurality of coils arranged to complete a circuit comprising said cathodes, means interconnecting said coils at points intermediate their ends for transmitting heating current to said cathodes, and means inductively related to said circuit for exciting said grids.

In witness whereof I have hereunto set my hand this 16th day of October, 1925.

ERNST F. W. ALEXANDERSON.